United States Patent [19]
Lutts et al.

[11] Patent Number: 4,989,222
[45] Date of Patent: Jan. 29, 1991

[54] ELECTRONIC HUBODOMETER

[75] Inventors: William P. Lutts; Thomas A. Diefenbaker, both of Richardson; George Fedorovich, Longview, all of Tex.

[73] Assignee: Stemco Inc., Longview, Tex.

[21] Appl. No.: 355,952

[22] Filed: May 22, 1989

[51] Int. Cl.$^5$ ............................................. G01C 22/00
[52] U.S. Cl. .............................. 377/24.1; 235/95 B; 377/16; 377/26; 377/29; 364/561
[58] Field of Search ................. 377/15, 16, 24.1, 24.2, 377/29, 26; 235/95 B; 364/561

[56] References Cited

U.S. PATENT DOCUMENTS

| | | | |
|---|---|---|---|
| 3,467,821 | 9/1969 | Arp | 377/15 |
| 3,598,309 | 8/1971 | Engher et al. | 235/95 B |
| 3,739,270 | 6/1973 | Miller et al. | 324/166 |
| 3,865,305 | 2/1975 | Sampey | 377/24 |
| 4,140,970 | 2/1979 | Graziano | 377/24.1 |
| 4,156,131 | 5/1979 | Haynes et al. | 235/95 C |
| 4,491,007 | 1/1985 | Crowdes, Jr. | 235/95 C |
| 4,506,147 | 3/1985 | Powell | 235/95 B |
| 4,510,379 | 4/1985 | Wallqvist et al. | 235/95 C |
| 4,532,710 | 8/1985 | Kinney et al. | 377/24.2 |
| 4,569,027 | 2/1986 | Nakano et al. | 377/24.2 |
| 4,642,787 | 2/1987 | McCarthy et al. | 364/561 |
| 4,665,497 | 5/1987 | Yamamura et al. | 364/561 |
| 4,680,454 | 7/1987 | Zeaman et al. | 235/95 B |
| 4,682,287 | 7/1987 | Mizuno et al. | 364/561 |
| 4,697,278 | 9/1987 | Fleischer | 377/24.1 |

Primary Examiner—John S. Heyman
Attorney, Agent, or Firm—Howard S. Reiter

[57] ABSTRACT

A hubodometer (10) for attachment to a vehicle's wheel structure for sensing a rotation of the wheel structure and for converting the sensed rotation to a distance travelled. The hubodometer comprises an outer housing (12) having a permanent magnet (28) affixed thereto for generating a magnetic field and a coupler (14) for coupling the housing to the wheel structure such that the outer housing rotates therewith. The hubodometer further comprises an anti-rotation mechanism (16) rotatably coupled within the outer housing, the mechanism having a plurality of components (18,20,22,24,30) coupled thereto, the components being stabilized against rotation thereby. The components include an electronic controller (20) and a plurality of magnetic field sensors (30). The plurality of sensors are disposed relative to the housing such that as the magnet rotates thereabout all of the plurality of magnetic field sensors do not simultaneously sense the magnetic field. In one embodiment the hubodometer is programmed via the plurality of sensors with calibration related data after the hubodometer is sealed. In another embodiment the display is powered by an output of an illumination-to-current conversion device (40), the device output also being coupled to the electronic controller such that illumination modulated in accordance with information is read and interpreted by the controller.

29 Claims, 2 Drawing Sheets

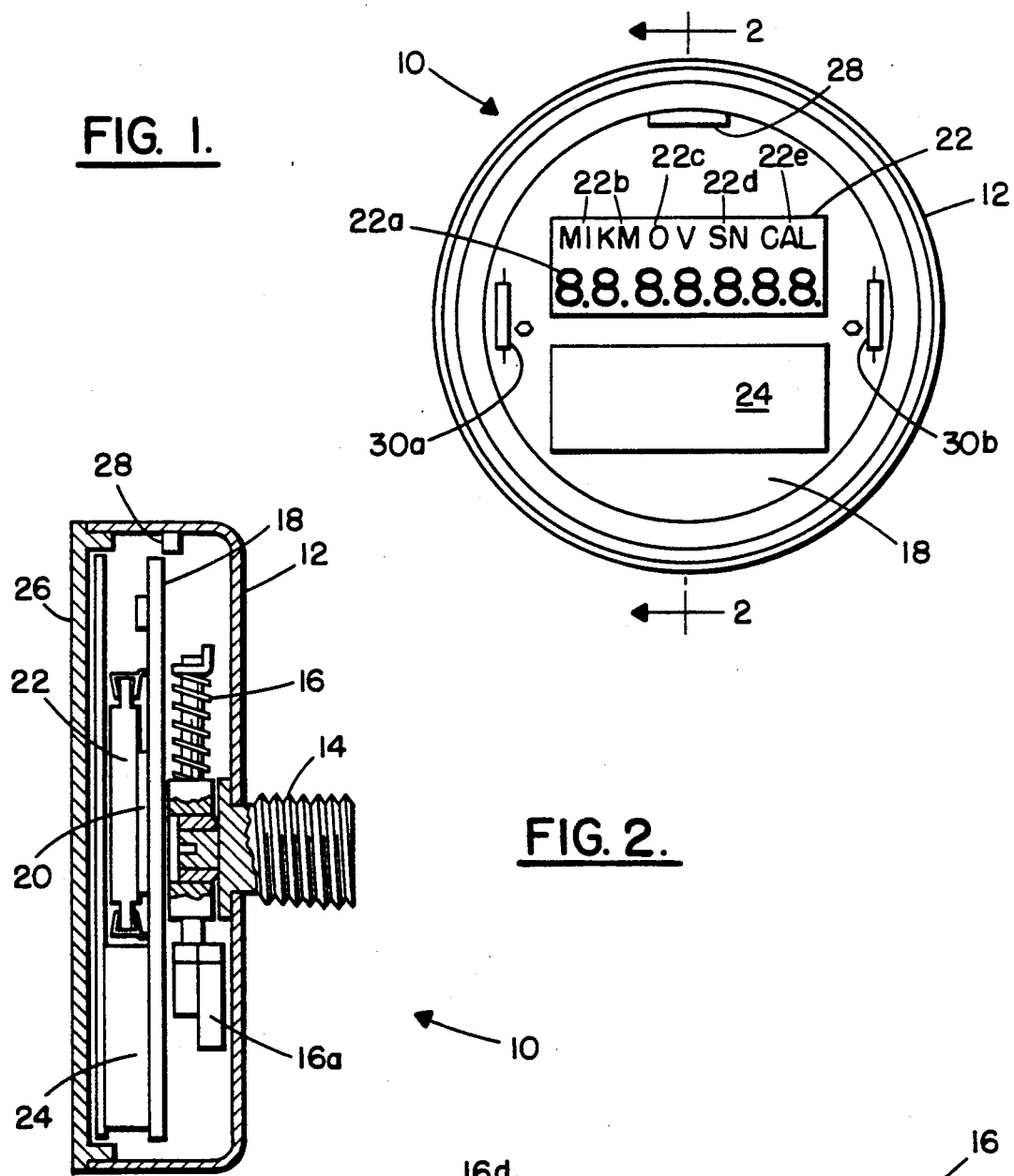
FIG. 1.
FIG. 2.
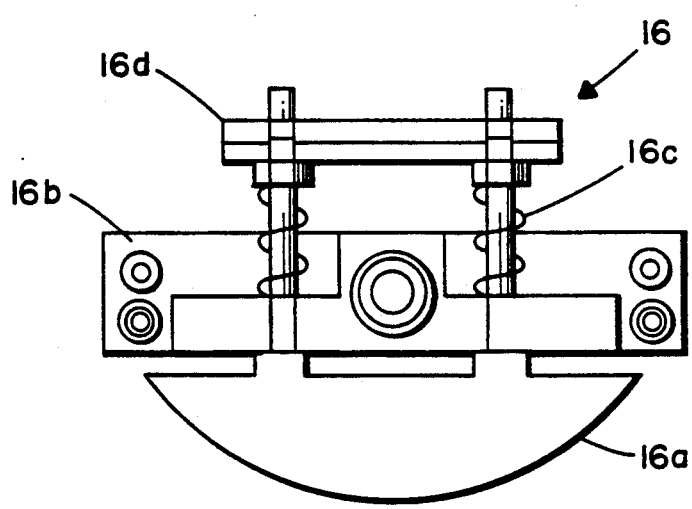
FIG. 3.

ELECTRONIC HUBODOMETER

FIELD OF THE INVENTION

This invention relates generally to hubodometers and, in particular, relates to an electronic hubodometer having a plurality of rotation sensing devices, the hubodometer being calibrated, in one embodiment, for operation through the rotation sensing devices.

BACKGROUND OF THE INVENTION

Fleet maintenance agreements, leasing agreements and/or certain governmental regulations require the use of a device to accurately record the distance traveled by a commercial vehicle. One device, commonly known as a hubodometer, is typically bolted or otherwise attached to a wheel hub of the vehicle where it senses rotation of the wheel, the sensed rotation being correlated with distance travelled. In that this distance information is used for determining highway usage fees as well as for compliance with contractual agreements it is imperative that the recording device be manufactured in a manner which prevents intentional or inadvertent alteration of the distance information. It is also imperative that the recording device be immune to transient movements of the device such that such movements are not interpreted as a rotation of the wheel hub.

It is therefore an object of the invention to provide a secure hubodometer that is highly resistant to external events that might alter the distance information recorded therein.

It is another object of the invention to provide a hubodometer that comprises an electronic controller and display that is readily programmed with calibration data after final assembly and sealing of the hubodometer casing.

It is one further object of the invention to provide a hubodometer that includes a plurality of rotation sensing devices for rendering the hubodometer substantially immune to transient movements such that the information expressive of the recorded distance travelled is highly accurate.

SUMMARY OF THE INVENTION

The foregoing problems are overcome and other advantages are realized by a hubodometer for attachment to a vehicle's wheel structure for sensing a rotation of the wheel structure and for converting the sensed rotation to a distance-related parameter. The hubodometer comprises an outer housing having a field generator, such as a permanent magnet, affixed thereto and a coupler for coupling the housing to the wheel structure such that the outer housing rotates therewith. The hubodometer further comprises an anti-rotation mechanism rotatably coupled within the outer housing, the mechanism having a plurality of components coupled thereto, the components being stabilized against rotation thereby. The components include a controller coupled to a plurality of field sensors, such as reed switches or Hall effect devices. The plurality of sensors are disposed relative to the housing such that as the field generator rotates thereabout, all of the plurality of field sensors do not simultaneously sense the field. A condition wherein all of the sensors are actuated by a field or fields is interpreted as a calibration procedure and calibration data is thereafter entered into the sealed unit via the sensors.

In another embodiment a display is powered by an output of an illumination-to-current conversion device, the device output also being coupled to the electronic controller such that illumination modulated in accordance with information is read and interpreted by the controller.

In accordance with a method of the invention there is disclosed a method of inputting digital information into a hubodometer, the hubodometer including a display for displaying at least distance units. The method includes the steps of (a) providing a hubodometer assembly that includes an electronic processing device having output signals from at least two magnetic sensing elements coupled thereto, (b) generating a first magnetic field for inducing the output signal of a first one of the magnetic sensing elements to enter a predetermined state, (c) generating a second magnetic field for inducing the output signal from a second one of the magnetic sensing elements to enter a predetermined state, (d) sensing with the processing device that both of the outputs of the magnetic sensing elements are simultaneously in the predetermined states, and (e) thereafter interpreting the output of at least one of the magnetic sensing elements as being expressive of calibration information.

BRIEF DESCRIPTION OF THE DRAWING

The above set forth and other features of the invention will be made more apparent in the ensuing Detailed Description of the Invention when read in conjunction with the attached Drawing, wherein:

FIG. 1 is front view of a hubodometer 10 constructed in accordance with the invention;

FIG. 2 is a side cut-away view of the hubodometer 10 taken along the section line 2—2 of FIG. 1;

FIG. 3 is a front view that shows in greater detail an anti-rotation mechanism of the hubodometer 10;

DETAILED DESCRIPTION OF THE INVENTION

Figure 4:
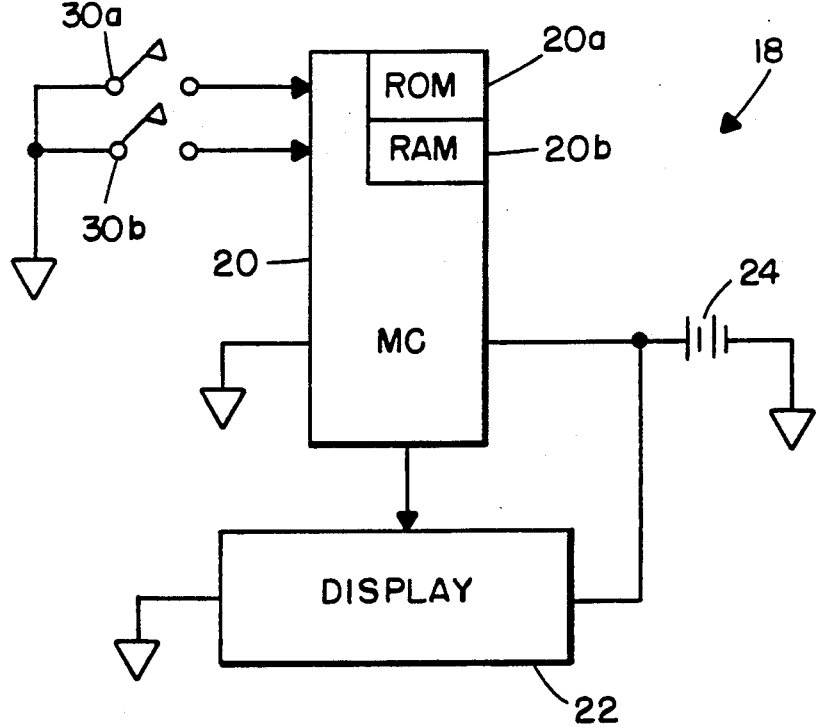
FIG. 4 is a simplified schematic diagram that shows the interconnection of a controller 20 with the rotation sensing switches 30 and the display 22.

Referring first to FIGS. 1 and 2 there is shown a front view and a side cross-sectional view, respectively, of a hubodometer 10 that is constructed and operated in accordance with the invention. Hubodometer 10 includes a housing 12 having a protruding threaded mounting stud 14. The stud 14 is used to mount the hubodometer 10 to the hub (not shown) of a vehicle such that the hubodometer is enabled to sense and record the rotation of the wheel. Rotatably mounted to the stud 14 is an anti-rotation mechanism 16 to which is mounted a printed circuit board 18. The overall diameter of the illustrated embodiment of the hubodometer 10 is approximately 3.5 inches while the depth of the housing 12 is approximately 1.1 inches. Of course, the dimensions and certain other details of construction described herein are not germane to the operation of the invention and may be varied as desired.

As can be seen in greater detail in FIG. 3 mechanism 16 includes a pendulous weight 16a, a main mounting bracket 16b to which the circuit board 18 is attached, a pair of weight springs 16c and a weight shaft angle 16d. In operation, mechanism 16 resists a force which would tend to cause it to rotate, thereby also preventing the rotation of the circuit board 18. The end result is that the housing 12 rotates around the periphery of the circuit board 18.

Referring to the schematic diagram of FIG. 4 in conjunction with FIGS. 1 and 2 it can be seen that the printed circuit board 18 includes a controller which, in a presently preferred embodiment of the invention, comprises a single chip microprocessor or microcontroller 20 having internal ROM 20a and RAM 20b memory. ROM 20a stores the operating program, calibration program, calibration passwords and other data. The RAM 20b is employed as temporary scratchpad storage. One suitable type of microcontroller is known in the art as a uPD75304 and is manufactured by NEC, Incorporated. Coupled to microcontroller 20 is a display module 22 and a battery 24 which powers, in this embodiment of the invention, both the microcontroller 20 and the display 22. Preferably the battery 24 is a high capacity, long life battery such as a lithium battery that provides several years of operating power for the electronic components. A transparent window 26 is employed to seal the aforementioned components within the housing 12. The window 26 can be cemented into place or can be retained by rolling over the outer edge of the housing 12 such that it engages the outer edge of the window 26.

As has been stated, during the rotation of a hub to which the hubodometer 10 is attached the anti-rotation mechanism 16 operates to prevent the rotation of the circuit board 18. As such, the circuit board 18 can be considered to remain stationary while the housing 12 rotates about the periphery of the circuit board 18. In order to sense this rotation of the housing 12 the hubodometer 10 includes a rotation sensing mechanism which, in the presently preferred embodiment of the invention, includes a permanent magnet 28 which is affixed to the inner wall of the housing 12 and a plurality of magnetic field sensors such as reed switches 30a and 30b mounted at oppositely disposed peripheral portions of the circuit board 18. As the magnet 28 rotates past one of the reed switches 30 it causes the reed switch to actuate by momentarily closing, the closure being sensed by the microcontroller 20. Of course, the switches may be of a type that actuate by momentarily opening under the influence of the magnetic field.

It should be pointed out that the rotation sensing mechanism can comprise a number of devices suitable for generating and for sensing a magnetic, an electrostatic, an electromagnetic or other type of field. Further by example the proximity of the stationary portion of the rotation sensing mechanism to the rotating portion can result in a detectable capacitive or inductive effect. As such, the invention is not to be construed to be limited for use only with a magnet and a plurality of magnetic field sensors.

During a rotation of the wheel the reed switches 30a and 30b alternately sense the proximity of the magnet 28 and thus alternately are actuated. The use of at least two reed switches 30 is advantageous in that a transient rocking motion of the mechanism 16 and circuit board 18 is not interpreted as a rotation. A rotation sensing program executed by the microcontroller 20 requires that each switch 30 be closed in sequence to indicate a revolution of the housing 12. A back and forth rocking motion typically actuates at most only one of the switches 30 resulting in the transient motion being ignored. The microcontroller 20 converts an accumulated number of sensed rotations into a distance display value, the conversion being accomplished with constants passed to the microcontroller 20 during a calibration process that will be described in detail below.

The display 22 is preferably a low power consumption type of display such as an LCD that is controlled by the microcontroller 20. In the present embodiment the display 22 is a seven digit display having a decimal point that is programmable to appear between or adjacent to selected ones of the digits. Display 22 includes an alphanumeric display 22a that normally indicates the accumulated distance traveled up to 999999.9 units of distance. In this embodiment of the invention the units of distance are expressed in either miles (MI) or kilometers (KM) although it is within the scope of the invention to employ any suitable unit of measurement. An initial distance value of the display 22a is set during the calibration procedure and may be either reset to zero or preset to any desired number.

The display 22b indicates the unit of distance measure associated with display 22a as either MI or KM. A parameter passed to the hubodometer 10 during the calibration procedure determines which of the annunciators, either MI or KM, is active. The MI or KM annunciator is illuminated and the distance displayed in display 22a except for relatively brief periods when the hubodometer displays a serial number or a calibration parameter in display 22a, as described below.

An over-range (OV) indicator 22c indicates that the hubodometer 10 has operated past the maximum distance for which the display 22a is calibrated. This indicator is displayed after the hubodometer 10 rolls over to a zero distance display. After rolling over to zero the distance display 22a continues to increment.

A serial number (SN) display 22d is periodically illuminated and the serial number of the hubodometer 10 is displayed instead of the normally displayed distance. The unique value of the hubodometer 10 serial number is another parameter which is passed to the hubodometer 10 during the aforementioned calibration procedure.

The calibration (CAL) indicator 22e is periodically illuminated when a seven digit calibration parameter is displayed in the display 22a. The calibration parameter typically indicates wheel and tire size calibration data, such as 10.00-20, that is initially programmed into the hubodometer lo during the calibration procedure. The calibration parameter, being a function of wheel and tire size, is employed by the microcontroller 20 to determine distance or other desired units based on the number of sensed rotations. As an example, if the display 22a is set to display tenths of miles and the particular tire size parameter indicates 500 tire rotations per mile, the calibration parameter is converted internally to the value 500 for use in determining distance travelled as a function of sensed rotations.

It should be noted that the microcontroller 20 enables the display 22 to be visible only when the hubodometer 10 is stationary, that is when rotation is not being sensed. This feature serves to reduce the battery 24 power consumption during periods of use when it would be difficult or impossible to read the display of the hubodometer.

Calibration is a process of loading and storing data into the microcontroller 20. Parameters stored during calibration are, for example, the tire size, serial number and choice of distance measure units. Other calibration parameters include those which control the allowance of a user field calibration, as opposed to a one time factory calibration.

In accordance with an aspect of the invention the hubodometer 10 includes apparatus for performing the calibration after the unit is assembled and sealed.

In accordance with another aspect of the invention the calibration data, including a "password", is embedded in a stream of serial digital data that is read by the microcontroller 20. To ensure the integrity of the information recorded by the hubodometer 10 the serial data contains the password data that is compared by the microcontroller 20 to data stored within the ROM 20a. Only if the transmitted password data matches a valid stored password is calibration of the unit allowed. In that the ROM 20a is physically part of the single chip microcontroller 20 it is extremely difficult for a user to gain access to the contents of this memory. Furthermore, the physical construction of the unit is such that an attempt to remove the microcontroller 20 from the circuit board 18 typically results in the destruction of the microcontroller 20. In any event, even if a user were to successfully remove the microcontroller 20 and gain access to the data stored within ROM 20a the user is faced with the arduous task of determining which of the several thousand bytes of data stored within the ROM 20a are the calibration password codes.

If the programming mechanism and algorithm were generally known, recalibration could be attempted by randomly programming all possible combinations of passwords. However, the microcontroller 20 is programmed to accept the incoming serial programming data at only a predetermined maximum number of bits per second. This predetermined maximum bit rate is such that it would require a significant number of years to input all of the possible password combinations for a password comprised of a plurality of eight bit bytes.

A further tampering safeguard is achieved by limiting the number of failed programming attempts to some predetermined small number. If a number of consecutive failed programming attempts, such as providing an invalid password, exceeds the predetermined number the microcontroller 20 is programmed to disable all external inputs and cease operation.

Although the hubodometer 10 programming is generally the manufacturer's responsibility, it may be desirable in some units to allow limited programming by a distributor or end user of the unit. For example, a distributor may wish to stock generic, partially calibrated hubodometers and program only the required tire/-wheel calibration constant before shipment. As another example, a user may desire to set an initial distance indication of other than zero as is commonly done on replacement units to match the distance indication of the hubodometer being replaced. This functionality is achieved by a calibration parameter that specifically grants further calibration access to the unit after the initial calibration. If such successive access is permitted, other calibration data determines if the access is to be allowed only once, or if multiple accesses are allowed. Typically the hubodometer 10 will also include a specific user password which differs from the password employed within the factory.

In a presently preferred embodiment of the invention a method of calibrating the hubodometer 10 employs the reed switches 30a and 30b. In that these reed switches, during normal operation, are actuated one at a time, programming via these switches is achieved by actuating both switches at the same time. The microcontroller 20, upon detecting that both switches 30a and 30b are simultaneously closed, performs the calibration function as opposed to the normal distance determining function.

Figure 5:
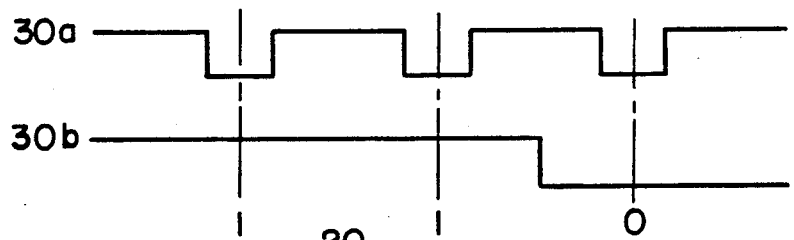
FIG. 5 is a timing diagram that illustrates a portion of a bit serial data stream input to the controller 20 via the rotation sensing switches 30.

FIG. 5 illustrates a timing diagram of the presently preferred method of calibrating the hubodometer 10, the method employing two electromagnets positioned external to the window 26 and approximately over the reed switches 30a and 30b. The electromagnets are energized and deenergized by a calibration controller, such as a computer, to controllably generate a magnetic field to open and close the reed switches 30a and 30b. In accordance with this example, switch 30a is closed to define a data bit clock. Microprocessor 20, upon determining that switch 30a is closed, reads the state of switch 30b to determine if a logical one (switch open) or a logical zero (switch closed) is being input. FIG. 5 shows by example the inputting of the octal number 6 (110) by this technique.

Figure 6:
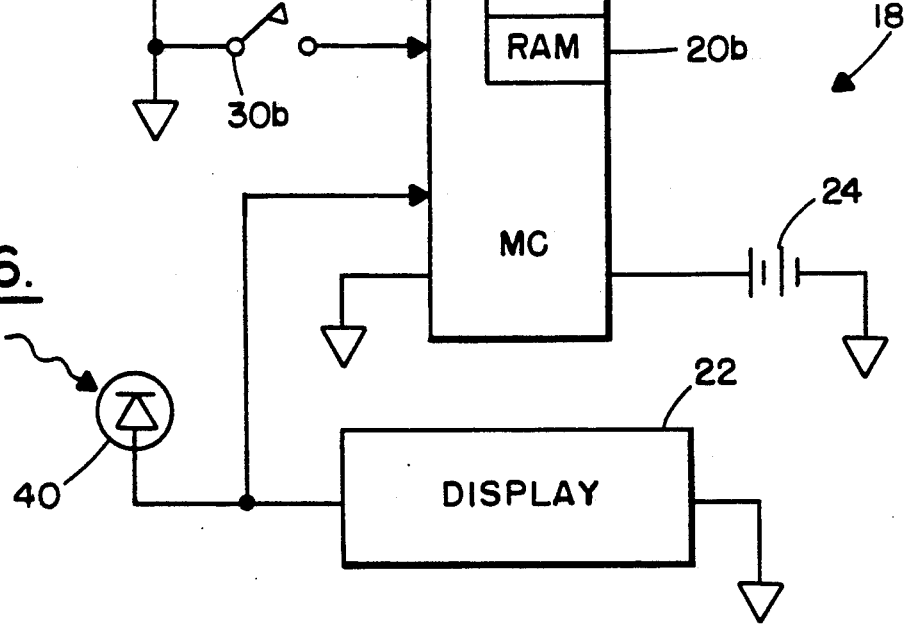
FIG. 6 is a block diagram showing another embodiment of the invention that includes a photocell 40.

The entered bit serial information is interpreted by the microcontroller 20 as password fields, various calibration related data fields and a checksum field for verifying the integrity of the calibration data. If the calibration data is verified the microcontroller 20 configures itself for operation in accordance therewith and begins operation. The above described technique is but one suitable technique for calibrating the microcontroller 20. For example, a fixed magnet could be employed to maintain one switch in a closed condition while the calibration data is converted by the programmer into a pulse width modulated data stream which in turn drives an electromagnet magnetically coupled to the other switch. Also, if more than two switches are incorporated within the hubodometer then two or more of the switches can be employed for inputting digital data with another one of the switches being employed as the clock source. Alternate method and apparatus of the invention are illustrated in FIG. 6 wherein the similarly designated components of FIG. 4, including at least one switch 30, include an electromagnetic energy-to-current conversion device such as a photovoltaic cell 40. Cell 40 converts illumination into electrical current which develops a voltage potential across the load represented by the display 22. The display 22 is coupled to the output of the cell 40, instead of to battery 24, and is powered thereby when the cell 40 is suitably illuminated. Such a configuration is especially beneficial for use in the sealed hubodometer unit having an internal battery in that battery life is extended. Further in accordance with this embodiment the microcontroller 20 has an input terminal coupled to the output of cell 40 for sensing the voltage potential output of the cell. Programming is achieved by controllably illuminating the cell 40, the microcontroller 40 sensing the resulting changes in potential at the output of cell 40 and interpreting the changes as calibration information. The external source of calibration illumination is modulated such as by being pulse width modulated as a function of the calibration information. If the microcontroller includes an integral A/D converter the illumination may be intensity modulated and the A/D converter employed to demodulate the voltage potential magnitude variations. Of course, an external A/D device can be provided if desired to accomplish this function.

While the invention has been particularly shown and described with respect to preferred embodiments thereof, it will be understood by those skilled in the art that changes in form and details may be made therein without departing from the scope and spirit of the invention. By example, Hall effect type devices may be used in place of the reed switches 30a and 30b. Also, the hubodometer may be calibrated to display other than linear distance as a function of rotation. By example, for a vehicle traversing a path within a particular area, such as a farm vehicle, the hubodometer can be calibrated to display in units of area such as acres or hectares. As such, the invention is intended to be limited only as it is set forth in the claims which follow.

What is claimed is:

1. Apparatus for attachment to a structure for sensing a rotation of the structure, the apparatus comprising a first portion having means for coupling to the structure such that the first portion rotates therewith, the apparatus further including a second portion stabilized against rotation and disposed relative to the first portion such that the first portion rotates about the second portion, the first portion including an object and the second portion including a plurality of sensor means each of which has an output for indicating the presence of the object in proximity thereto, the plurality of sensor means being disposed relative one to another such that all of the sensor means do not simultaneously sense the presence of the object as it rotates thereby, the apparatus further including means coupled to the sensor means outputs for converting output signal therefrom to distance-related information, the converting means including means for determining that the first portion has undergone one revolution relative to the second portion, the determining means being responsive to a predetermined number of the sensor means sensing the proximity of the object in a predetermined sequence for discriminating against a transient motion that would otherwise affect a single sensor means relative to the object.

2. Apparatus as set forth in claim 1 wherein the converting means comprises an electronic processing device having a program memory coupled thereto.

3. Apparatus as set forth in claim 2 wherein the plurality of sensor means comprises a plurality of switch means each of which is actuated by a proximity of the object thereto, each of the switch means having an output coupled to an input of the processing device.

4. Apparatus as set forth in claim 3 wherein the processing device comprises means, responsive to a condition wherein a plurality of the switch means are simultaneously actuated, for executing a program that inputs data to the processing means.

5. Apparatus for attachment to a structure for sensing a rotation of the structure, the apparatus comprising a first portion having means for coupling to the structure such that the first portion rotates therewith, the apparatus further including a second portion stabilized against rotation and disposed relative to the first portion such that the first portion rotates about the second portion, the first portion including an object and the second portion including a plurality of sensor/switch means each of which has an output for indicating the presence of the object in proximity thereto, the plurality of sensor/switch means being disposed relative one to another such that all of the sensor/switch means do not simultaneously sense the presence of the object as it rotates thereby, the apparatus further including means coupled to the sensor/switch means outputs for converting output signals therefrom to distance-related information, the converting means comprising electronic processing means having a program memory coupled thereto and being responsive to a condition wherein a plurality of the sensor/switch means are simultaneously actuated for executing a program that inputs calibration-related data to the processing means.

6. Apparatus as set forth in claim 5 wherein the electronic processing means comprises means for interpreting the actuation of one of the sensor/switch means as a clock signal and the actuation of at least one other one of the sensor/switch means as a bit of data associated with the clock signal.

7. Apparatus as set forth in claim 6 wherein the program that inputs data inputs calibration-related data.

8. Apparatus as set forth in claim 6 wherein the object comprises a magnet and wherein each of the sensor/switch means comprises a reed switch.

9. Apparatus as set forth in claim 6 wherein the object comprises a magnet and wherein each of the sensor/switch means comprises a Hall effect sensor.

10. A method of inputting digital information into a hubodometer, the hubodometer including a display for displaying at least selected units of measurement, comprising the steps of:

providing a hubodometer assembly that includes an electronic processing device having output signals from at least two magnetic sensing elements coupled thereto; generating a first magnetic field for inducing the output signal of a first one of the magnetic sensing elements to enter a predetermined state;

generating a second magnetic field for inducing the output signal from a second one of the magnetic sensing elements to enter a predetermined state;

sensing with the processing device that both of the outputs of the magnetic sensing elements are simultaneously in the predetermined states; and thereafter interpreting the output of at least one of the magnetic sensing elements as being expressive of bit serial binary information.

11. A method as set forth in claim 10 wherein the digital information is expressive of a password, the method further including the steps of:

receiving the password;

comparing the password to a stored password to determine if a match exists; and if the received password matches the stored password receiving additional digital information.

12. A method as set forth in claim 11 wherein the additional digital information includes information expressive of a tire size.

13. A method as set forth in claim 11 wherein the additional digital information includes a serial number of the hubodometer.

14. A method as set forth in claim 11 wherein the additional digital information includes a format for displaying distance and units of measure associated with the displayed distance.

15. A method as set forth in claim 11 wherein the additional digital information includes data for enabling a subsequent calibration of the hubodometer to occur.

16. A hubodometer for attachment to a vehicle's wheel structure for sensing a rotation of the wheel structure and for converting the sensed rotation to a selected unit of measurement, the hubodometer comprising an outer housing having a magnet affixed thereto for generating a magnetic field and means for coupling the housing to the wheel structure such that the outer housing rotates therewith, the hubodometer further comprising an anti-rotation mechanism rotatably coupled within the outer housing and having a plurality of components coupled thereto for stabilizing the components against rotation, the components including an electronic control means and a plurality of magnetic field sensor means each having an output coupled to the control means for providing a signal thereto, the plurality of magnetic field sensor means being disposed relative to one another such that as the magnet rotates thereabout all of the plurality of magnetic field sensor means do not simultaneously respond to the magnetic field, the control means being responsive only to a sequential reception of signals from a plurality of the magnetic field sensor means for indicating the occurrence of a revolution of the outer housing and for discriminating against a transient motion that would otherwise affect a single magnetic field sensor means relative to the magnet.

17. A hubodometer as set forth in claim 16 wherein the electronic control means is coupled to outputs of the plurality of sensor means for converting the output signals thereof to selected units of measurement, the components including an electronic display means coupled to the control means for displaying the units of measurement.

18. A hubodometer as set forth in claim 17 wherein the control means comprises an electronic processing device having an internal program memory.

19. A hubodometer as set forth in claim 18 wherein the plurality of magnetic field sensor means comprises a plurality of switch means, each of the switch means having an output coupled to an input of the processing device, the switch means being positioned such that not all of the switch means are simultaneously activated due to the proximity of the magnet.

20. A hubodometer as set forth in claim 17 and further comprising means for converting electromagnetic radiation to a current output for powering at least the display means.

21. A hubodometer as set forth in claim 19 wherein the processing device includes means for interpreting a condition wherein a plurality of the switch means are simultaneously activated as a calibration data input procedure, the processing device inputting the calibration data through at least one of the switch means.

22. A hubodometer as set forth in claim 20 wherein the electronic control means is coupled to an output of the converting means for detecting the presence of a voltage potential resulting from an illumination of the converting means.

23. A hubodometer as set forth in claim 22 wherein the electronic control means includes means for interpreting a varying amplitude or time pattern of the voltage potential as a calibration data input procedure, the processing device inputting the calibration data through at least the input coupled to the converting means.

24. A method of operating a rotation sensing device coupled during operation to a rotating structure, comprising the steps of:

stabilizing a plurality of sensing means against rotation while permitting an object sensed by the sensing means to rotate with the structure and about the plurality of sensing means;

sensing with each of the sensing means the object as it rotates thereby; and determining, after a predetermined number of the sensing means have sensed the object in a predetermined sequence, that the structure has undergone one revolution while discriminating against a transient motion that would otherwise affect a single sensing means relative to the object.

25. A method as set forth in claim 24 wherein the object comprises a magnet, wherein each of the sensing means comprises a switch means and wherein the step of sensing is accomplished by actuating the switch means.

26. A method as set forth in claim 25 wherein the step of determining is accomplished by an electronic control means having inputs coupled to the plurality of switch means.

27. A method as set forth in claim 24 and further comprising the steps of:

displaying information when it is determined that the structure is not revolving relative to the sensing means; and inhibiting the display of information when it is determined that the structure is revolving relative to the sensing means.

28. A method as set forth in claim 27 wherein the step of displaying includes the steps of displaying rotation-related information for a first interval of time and displaying calibration-related information during a second interval of time.

29. A hubodometer for attachment to a vehicle's wheel structure for sensing a rotation of the wheel structure and for converting the sensed rotation to a selected unit of measurement, the hubodometer comprising an outer housing having a field generating means affixed thereto and means for coupling the housing to the wheel structure such that the outer housing rotates therewith, the hubodometer further comprising an anti-rotation mechanism rotatably coupled within the outer housing and having a plurality of components coupled thereto for stabilizing the components against rotation, the components including electronic control means and at least one field sensor means, the control means being coupled to an output of the at least one field sensor means for converting the output signal thereof to selected units of measurement, the components further including an electronic display means coupled to the control means for displaying the units of measurement, the electronic display means further being coupled to an output of and powered by electromagnetic energy-to-current conversion means, the conversion means output also being coupled to an input of the electronic control means whereby electromagnetic energy modulated in accordance with calibration-related information is detected and the information inputted by the electronic control means.

* * * * *